US008085272B1

(12) United States Patent
Molnar et al.

(10) Patent No.: US 8,085,272 B1
(45) Date of Patent: Dec. 27, 2011

(54) METHOD AND SYSTEM FOR IMPROVING DATA COHERENCY IN A PARALLEL RENDERING SYSTEM

(75) Inventors: Steven E. Molnar, Chapel Hill, NC (US); Cass W. Everitt, Round Rock, TX (US); Roger L. Allen, Lake Oswego, OR (US); Gary M. Tarolli, Concord, MA (US); John M. Danskin, Cranston, RI (US); Adam Clark Weitkemper, Holly Springs, NC (US); Mark J. French, Raleigh, NC (US)

(73) Assignee: NVIDIA Corporation, Santa Clara, CA (US)

( * ) Notice: Subject to any disclaimer, the term of this patent is extended or adjusted under 35 U.S.C. 154(b) by 1033 days.

(21) Appl. No.: 11/556,657

(22) Filed: Nov. 3, 2006

(51) Int. Cl.
*G06F 15/80* (2006.01)
(52) U.S. Cl. ......... 345/505; 345/501; 345/502; 345/534
(58) Field of Classification Search .................. 345/534, 345/501, 502, 505
See application file for complete search history.

(56) References Cited

U.S. PATENT DOCUMENTS

| 6,762,763 | B1* | 7/2004 | Migdal et al. ................. 345/506 |
| 2003/0225815 | A1* | 12/2003 | Brenner et al. ............... 709/106 |
| 2004/0222998 | A1* | 11/2004 | Doyle et al. .................. 345/559 |
| 2007/0061788 | A1* | 3/2007 | Dodge et al. .................. 717/140 |
| 2007/0157206 | A1 | 7/2007 | Rakvic et al. |

OTHER PUBLICATIONS

Whitman, Scott. "Dynamic Load Balancing for Parallel Polygon Rendering." IEEE Computer Graphics and Applications 14.4 (1994): 41-48.*
Chambers, Mike. "NV News—NVIDIA GeForce3 Preview—Lightspeed Memory Architecture." Welcome to nV News—An NVIDIA Fansite. Feb. 7, 2001. Web. Sep. 9, 2009. <http://www.nvnews.net/previews/geforce3/lightspeed_memory.shtml>.*
Eggers, et al. "Simultaneous Multithreading: A Platform for Next-Generation Processors," IEEE Micro, vol. 17, No. 5, pp. 12-19, Sep./Oct. 1997.
Office Action, U.S. Appl. No. 11/556,660, dated Oct. 14, 2009.

* cited by examiner

*Primary Examiner* — Xiao M. Wu
*Assistant Examiner* — Scott E Sonners
(74) *Attorney, Agent, or Firm* — Patterson & Sheridan, LLP

(57) ABSTRACT

A method and system for improving data coherency in a parallel rendering system is disclosed. Specifically, one embodiment of the present invention sets forth a method, which includes the steps of receiving a common input stream, tracking a periodic event associated with the common input stream, generating a plurality of fragment streams from the common input stream, inserting a marker based on an occurrence of the periodic event in a first fragment stream in the multiple fragment streams, and utilizing the marker to influence the processing of the first fragment stream so that a plurality of raster operation (ROP) request streams maintains substantially the same coherence as the common input stream. Each fragment stream is independently processed and corresponds to one of the ROP request streams.

14 Claims, 9 Drawing Sheets

METHOD AND SYSTEM FOR IMPROVING DATA COHERENCY IN A PARALLEL RENDERING SYSTEM

BACKGROUND OF THE INVENTION

1. Field of the Invention

Embodiments of the present invention relate generally to a parallel rendering system and more specifically to a method and system for improving data coherency in such a system.

2. Description of the Related Art

Unless otherwise indicated herein, the approaches described in this section are not prior art to the claims in this application and are not admitted to be prior art by inclusion in this section.

A graphics system generally adopts a highly parallel architecture to meet the ever increasing processing demands for realism, quality, and real-time interactivity of displayed images and videos. FIG. 1A is a simplified conceptual diagram of a parallel rendering system, 100. Specifically, a setup unit 101 receives geometric primitives from a geometry pipeline. Setup unit 101 determines the interpolation parameters for each geometric primitive that it receives. Then setup unit 101 directs a stream of the transformed primitives to coarse raster 102, which determines which pixel tiles may have contributions from any of these transformed primitives. Coarse raster 102 also directs these identified pixel tiles, containing 16 by 16 pixels in one implementation, via distributor 104 to any of fine $raster_0$ to fine $raster_n$. Each fine raster is associated with a shader engine and is responsible for computing a fine raster transaction for a subset of pixels (e.g., 4 by 4 samples in one implementation) within each pixel tile at least partially covered by a geometric primitive. Each of the n shader engines is screen mapped. In other words, each shader engine is assigned a rectangular pixel tile in the screen space (16 by 16 pixels in one implementation) in an interleaved pattern. All geometry primitives that hit a particular pixel tile are processed by the shader engine assigned to that pixel tile.

In addition, each of the n shader engines receives the fine raster transactions from its associated fine raster (e.g., shader $engine_0$ is associated with fine $raster_0$). Then each shader engine computes the color values for each of the covered pixels described by the fine raster transaction, performs texture fetches via a texture crossbar (T-crossbar), such as T-crossbar 110, and directs the shaded pixels to a crossbar for Z data (Z-crossbar), such as Z-crossbar 106, and a color crossbar (C-crossbar), such as C-crossbar 108. More specifically, T-crossbar 110 arbitrates among the parallel streams of texture requests from the multiple shader engines and directs the selected requests to a frame buffer, such as $FB_0$. Conversely, T-crossbar 110 may also direct the retrieved texels from $FB_0$ to the requesting shader engine, such as shader $engine_0$. After performing functions such as texture mapping and texture blending to determine the final surface properties, the shader engines direct the shaded pixel fragments associated with the fine raster transactions to Raster OPerations ("ROP") units (e.g., $ROP_0$, $ROP_1$, and $ROP_n$) via Z-crossbar 106 and C-crossbar 108 for further processing. Each ROP unit conducts depth and stencil testing on the shaded pixels, as specified by the graphics application, and writes the pixels surviving depth and stencil testing to its corresponding frame buffer (e.g., $FB_0$ corresponds to $ROP_0$). It should be noted that each of the aforementioned frame buffers maps to a contiguous span of memory. Also, the various crossbars discussed above (e.g., T-crossbar 110, Z-crossbar 106, and C-crossbar 108) could be implemented in a unified and shared crossbar.

The overall performance of parallel rendering system 100 described above degrades significantly if the frame buffers are accessed inefficiently. For instance, if the shader engines simultaneously issue requests to access locations in a particular memory bank of a frame buffer that map to different pages in that memory bank, then multiple pages need to be accessed to fulfill such requests. Because each page needs to be pre-charged prior to the utilization of the page, fulfilling these simultaneous requests to access the multiple pages usually introduces undesirable delays, each of which may equal the amount of time needed to activate and pre-charge a page. Furthermore, because fetched texels are typically cached in parallel rendering system 100, retrieving texels from different pages often times leads to cache misses and results in excessive cache thrashing.

Inefficient accesses to the frame buffers can be attributed to having output streams from the parallel shader engines with poor spatial and temporal locality. In particular, shader engines issue memory requests for texture reads, Z reads and/or writes, and color reads and/or writes as processing proceeds. Statistically, when a shader engine begins to operate out of phase relative to the other shader engines, meaning that the shader engine starts finishing work at a different time than the other shader engines, the shader engine is more likely to operate on areas of the screen space that are far from the other shader engines. Such screen space "divergence" can cause the different shader engines to access different frame buffer pages at the same time, leading to the type of inefficient frame buffer accesses described above. In addition, multiple shader engines may request for the same frame buffer page but at different times. The time lapse between the requests may cause the page to be activated and pre-charged again, resulting also in inefficient frame buffer accesses.

As an illustration, FIG. 1B shows a display screen divided into pixel tiles that map to shader engines and pixel tiles that map to frame buffer partitions. In one implementation, each of the shader engines processes 16 by 16 pixel tiles of display screen 130, and each of the frame buffer partitions in memory system 160 stores 16 by 4 pixel tiles of display screen 130. Also, a page boundary 162 in memory system 160 separates page 164 from page 166. Here, pixel tile 132 maps to four different frame buffer partitions, namely $FB_0$, $FB_1$, $FB_2$, and $FB_3$ in page 164, and pixel tile 138 maps to the same four frame buffer partitions, $FB_0$, $FB_1$, $FB_2$, and $FB_3$, but in page 166. Suppose shader $engine_0$ is responsible for pixel tiles 132 and 136, and shader $engine_1$ is responsible for pixel tiles 134 and 138. Because successive tiles processed by each shader engine are spatially far apart in display screen 130, they are likely to access different pages in the respective FBs, such as pages 164 and 166. Each of the FBs, such as $FB_0$, receives requests from multiple shader engines, which can have various skews relative to each other. For example, if shader $engine_0$ and shader $engine_1$ finish their respective operations at different times for pixel tiles 140 and 148, they may intermingle accesses to different pages in $FB_0$. As mentioned above, intermingling accesses to different pages in a single frame-buffer partition results in inefficient frame buffer accesses. Without a corrective mechanism, shader $engine_0$ may move even further out of synchronization with the other shader engines and worsen the aforementioned problem of inefficient accesses to the frame buffers.

As the foregoing illustrates, what is needed in the art is a technique to counter the possible divergence among the shader engines to increase the likelihood of efficient accesses of the frame buffers in a parallel rendering system.

SUMMARY OF THE INVENTION

A method and system for improving data coherency in a parallel rendering system is disclosed. Specifically, one embodiment of the present invention sets forth a method, which includes the steps of receiving a common input stream, tracking a periodic event associated with the common input stream, generating a plurality of fragment streams from the common input stream, inserting a marker based on an occurrence of the periodic event in a first fragment stream in the multiple fragment streams, and utilizing the marker to influence the processing of the first fragment stream so that a plurality of raster operation (ROP) request streams maintains substantially the same coherence as the common input stream. Each fragment stream is independently processed and corresponds to one of the ROP request streams.

One advantage of the disclosed method and system is that it addresses at least the problem of inefficient frame buffer accesses, because of the poor temporal and spatial locality of these frame buffer accesses. One reason for the lack of locality is due to a parallel set of pipelines operating independently on a common input stream without any restorative forces after processing.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A method and system for improving data coherency in a parallel rendering system is described. In the following description, for the purposes of explanation, numerous specific details are set forth in order to provide a thorough understanding of the present invention. It will be apparent, however, to one skilled in the art that the present invention may be practiced without these specific details.

Throughout this disclosure, a "page" or a "memory page" generally refers to a row in a memory bank, which consists of an array of capacitors, which store binary data. A shader engine receives a "tile of work" when one or more geometric primitives intersect the pixel tile for which the shader engine is responsible. A "tick" broadly refers to a marker for the parallel streams of raster transactions flowing through the pipes in a parallel rendering system, such as parallel rendering system 200. A "processed fragment stream" broadly refers to a stream of fragments processed by each parallel shader engine; a "ROP request stream" broadly refers a stream of requests from a ROP unit to frame buffer after the ROP unit receives the processed fragment stream; a "texture stream," on the other hand, refers to a stream of requests for texels issued by the shader engine. Also, if a ROP request stream is for Z data or color data, then such a stream is respectively referred to as "ZROP request stream" or "CROP request stream," respectively.

Figure 1A:
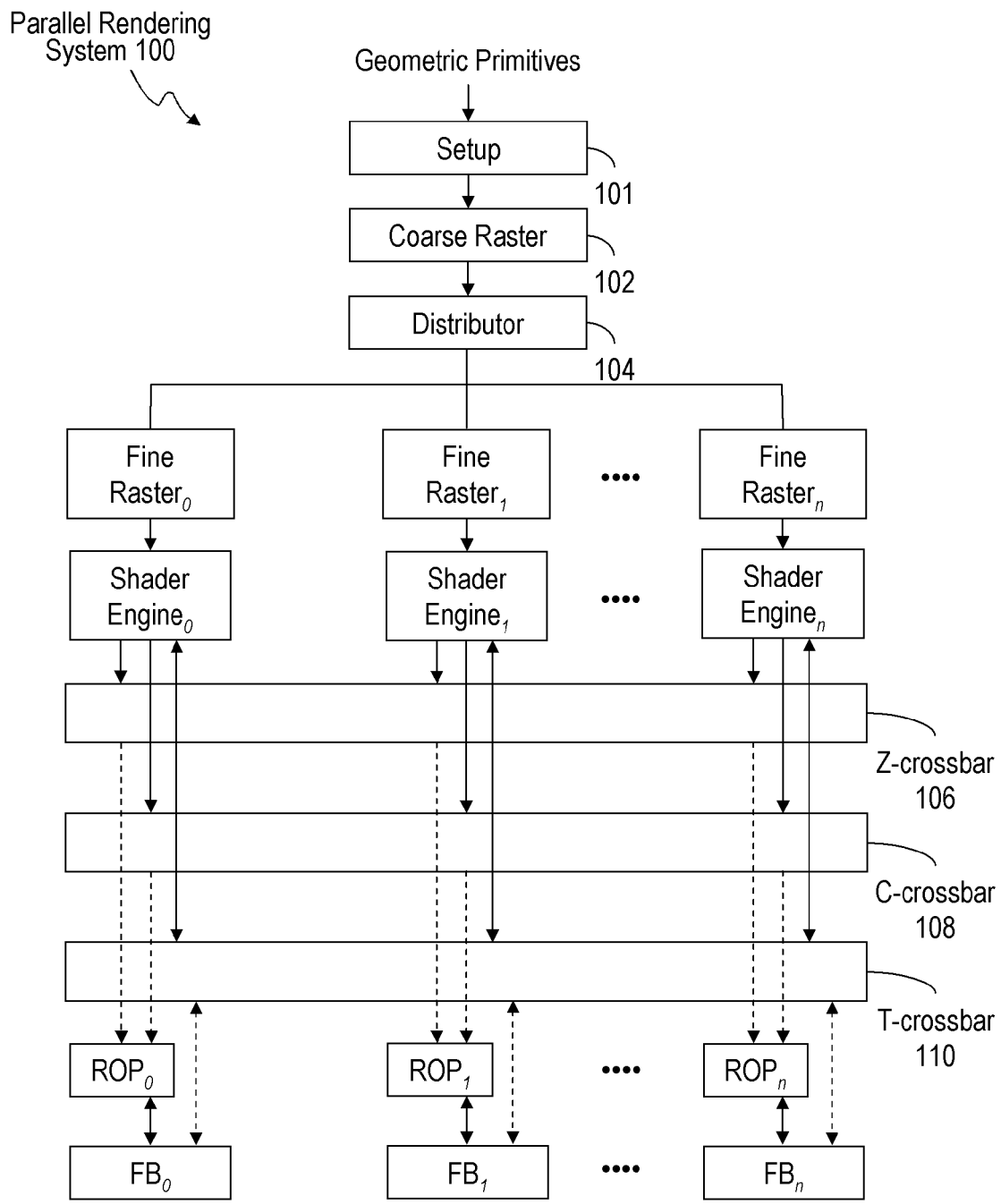
FIG. 1A is a simplified conceptual diagram of a parallel rendering system.
Figure 1B:
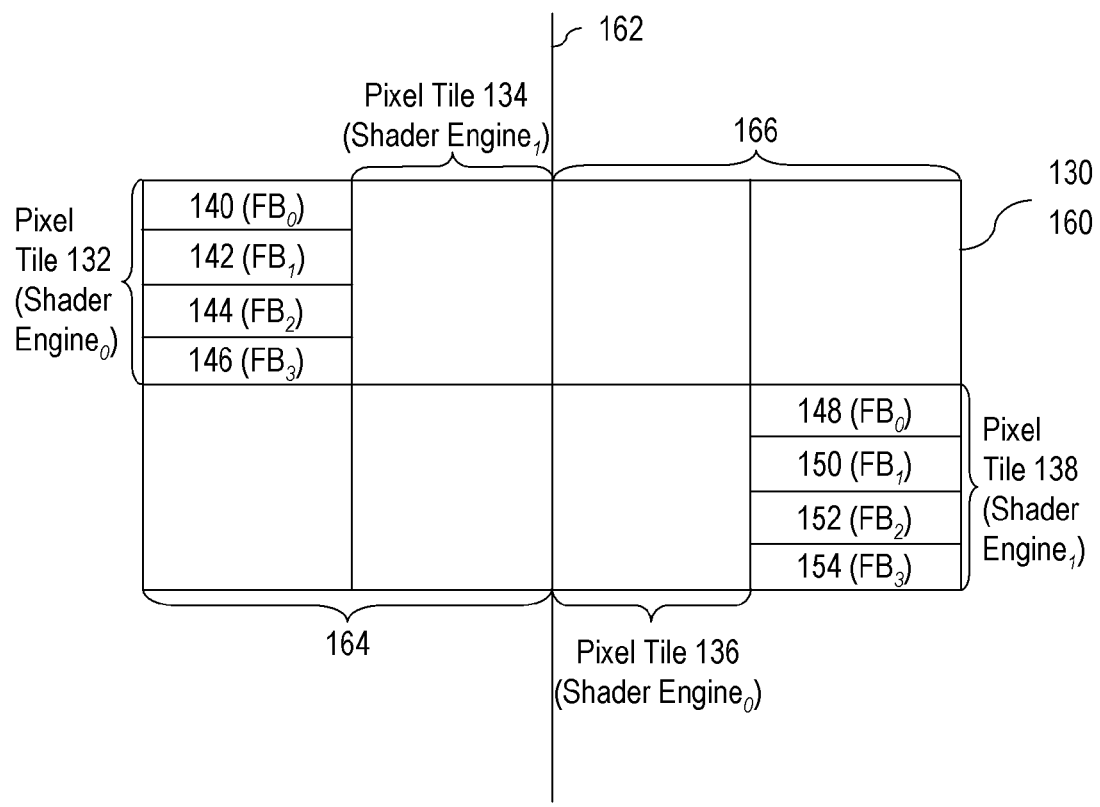
FIG. 1B shows a display screen divided into pixel tiles that map to shader engines and pixel tiles that map to frame buffer partitions.
Figure 2:
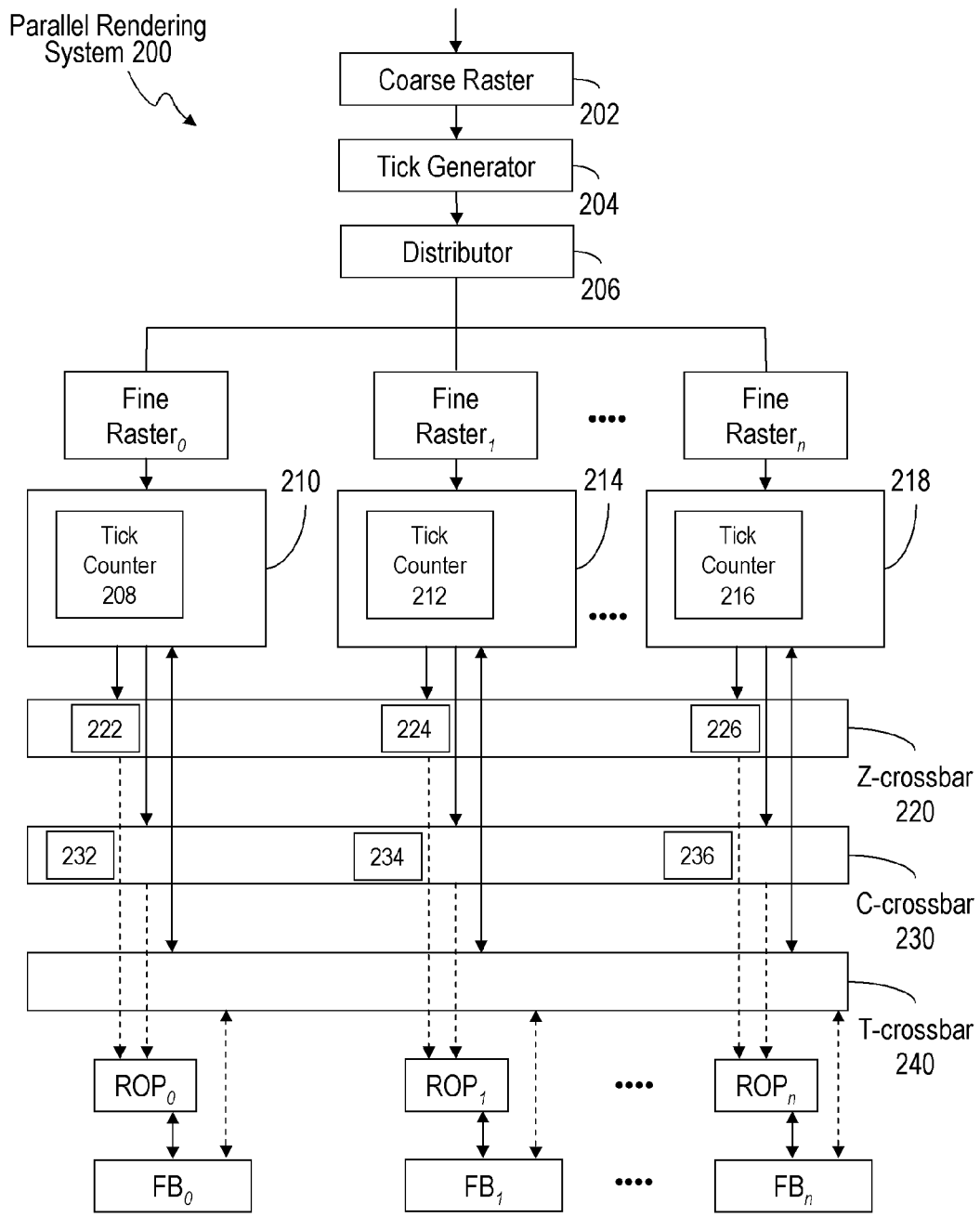
FIG. 2 is a simplified block diagram of a parallel rendering system, according to one embodiment of the present invention.

FIG. 2 is a simplified block diagram of parallel rendering system 200, according to one embodiment of the present invention. Parallel rendering system 200 includes a unit that marks periodic events in its serial input stream of work before the system distributes work to its parallel shader engines. More particularly, parallel rendering system 200 includes tick generator 204 and various tick counters, such as tick counters 208, 212, and 216 residing in shader engines, tick counters 222, 224, and 226 residing in Z-crossbar 220, and tick counters 232, 234, and 236 residing in C-crossbar 230. Tick generator 204, which can be placed anywhere before the rendering pipeline branches off, issues ticks at certain intervals in the raster transaction streams associated with the n shader engines. The shader engines, such as 210, 214, and 218, Z-crossbar 220, and C-crossbar 230 use the various tick counters to track the ticks flowing through parallel rendering system 200 and control the flow of the fine raster transactions. It should be apparent to a person skilled in the art to recognize that parallel rendering system 200 shown in FIG. 2 is for illustration purposes only and shall not be construed to limit the scope of the invention. For example, other systems with a different partitioning of setup and raster units can implement one or more embodiments of the invention. Broadly speaking, the teachings of the invention may be implemented in any parallel rendering system where divergences among processing elements may lead to inefficient memory accesses.

The issuing of ticks represents time advancement for the operations in parallel rendering system 200. In one embodiment, the interval for issuing a tick is determined by a number of clock cycles (e.g., issuing a tick every 16 clock cycles); in another embodiment, the interval is determined by a number of the transactions generated by coarse raster 202 (e.g., issuing a tick after receiving 20 transactions); in yet another embodiment, the interval is determined by the traversal of the screen space. More specifically, one embodiment of tick generator 204 establishes a programmable area in the screen space, otherwise referred to as a "puddle." The shape of the puddle can be dynamic, with either vertical or horizontal orientations. If the tiles of work presented to tick generator 204 are within the current puddle, then tick generator 204 does not issue any ticks. On the other hand, if the tiles of work stray outside the puddle, then tick generator 204 issues a tick. It is worth noting that the puddle can be deliberately configured so that when the tiles of work fall within the puddle, the tiles are likely to be coherent (i.e., mapping to the same page in memory). Subsequent paragraphs will further detail the processing of the tiles of work in between ticks.

Furthermore, in one implementation, every data packet has a special field for conveying ticks. In some instances, one or more ticks may be represented in the data packet. In other instances, no ticks are represented in the data packet. The presence or absence of ticks causes no functional difference in the processing of the data packet; instead, it is used to improve the coherence among the operations in parallel rendering system 200. Importantly, this way of conveying ticks down the pipeline does not cost additional processing cycles. Also in one embodiment, the same number of ticks flows through each shader engine pipe. For example, if work is flowing through particular shader engine pipes, such as the pipes associated with shader engine$_0$ and shader engine$_1$, in the same cycle a tick is issued, then the tick accompanies each of the two packets of work flowing through the shader engine$_0$ and shader engine$_1$ pipes. On the other hand, if no work is going to a shader engine pipe, such as the shader engine$_n$ pipe, then a "coherence tick packet" is sent through the shader engine$_n$ pipe. This coherence tick packet does not contain any work but includes tick information, so that the same number of ticks is sent down all parallel pipes. In one implementation, a single coherence tick packet is capable of representing multiple ticks. Thus, if no work is flowing through the shader engine$_n$ pipe in 3 consecutive cycles in which 3 ticks have been issued, then the coherence tick packet could contain information representative of all 3 ticks.

With the ticks flowing through the shader engine pipes either along with the packets of work or within the coherence tick packets, parallel rendering system 200 utilizes the tick counters to synchronize certain operations of the system. Because of the certain attributes of the shader engine, the processing of the ticks associated with the parallel processed fragment streams differs from the processing of the ticks associated with the parallel texture streams. More specifically, one attribute of the shader engine is the use of multiple independently operating threads. Therefore, although the shader engine receives a stream of the fine raster transactions in a particular sequence, the threads may process these transactions and issue the associated texture requests out of order. It should be noted that the complications associated with this non-sequential processing scenario within a single shader engine are further exacerbated by the parallel processing of at least n shader engines in parallel rendering system 200.

Another attribute of the shader engine is the maintenance of order between its input and the output, notwithstanding the potential out-of-order processing within the shader engine. In one implementation, the shader engine maintains a first-in-first-out order. Thus, suppose a first pixel enters the shader engine prior to a second pixel in time. Even if the shader engine finishes the processing of the second pixel before the first pixel, by adhering to the first-in-first-out order, the shader engine would still wait until the processing of the first pixel is completed and output the first pixel ahead of the second pixel. Since a ROP request stream comprises the transactions associated with the pixels that have been processed by the shader engine, the ROP request stream follows the order imposed by the shader engine. For clarity purposes, the following discussions will separately describe the use of the tick information in managing the ROP request streams and the texture streams.

Tick counters are provided at each input of Z-crossbar 220 and C-crossbar 230. The counters are wrapping counters that are large enough to span the maximum number of ticks that could be in the pipes of parallel rendering system 200 at once. They increment when an input packet bearing ticks (e.g., a data packet bearing ticks or a coherence tick packet) is received. The counter is incremented by the tick count on the received input packet. Based on these tick counters, Z-crossbar 220 and C-crossbar 230 are able to accelerate or stall the processed fragment streams to the ROP units, so that the ROP units can generate ROP request streams to the frame buffers with the same spatial and temporal coherence as the processed fragment streams they receive. It should be apparent to a person with ordinary skills in the art to utilize other types of counters without exceeding the scope of the invention.

Figure 3:
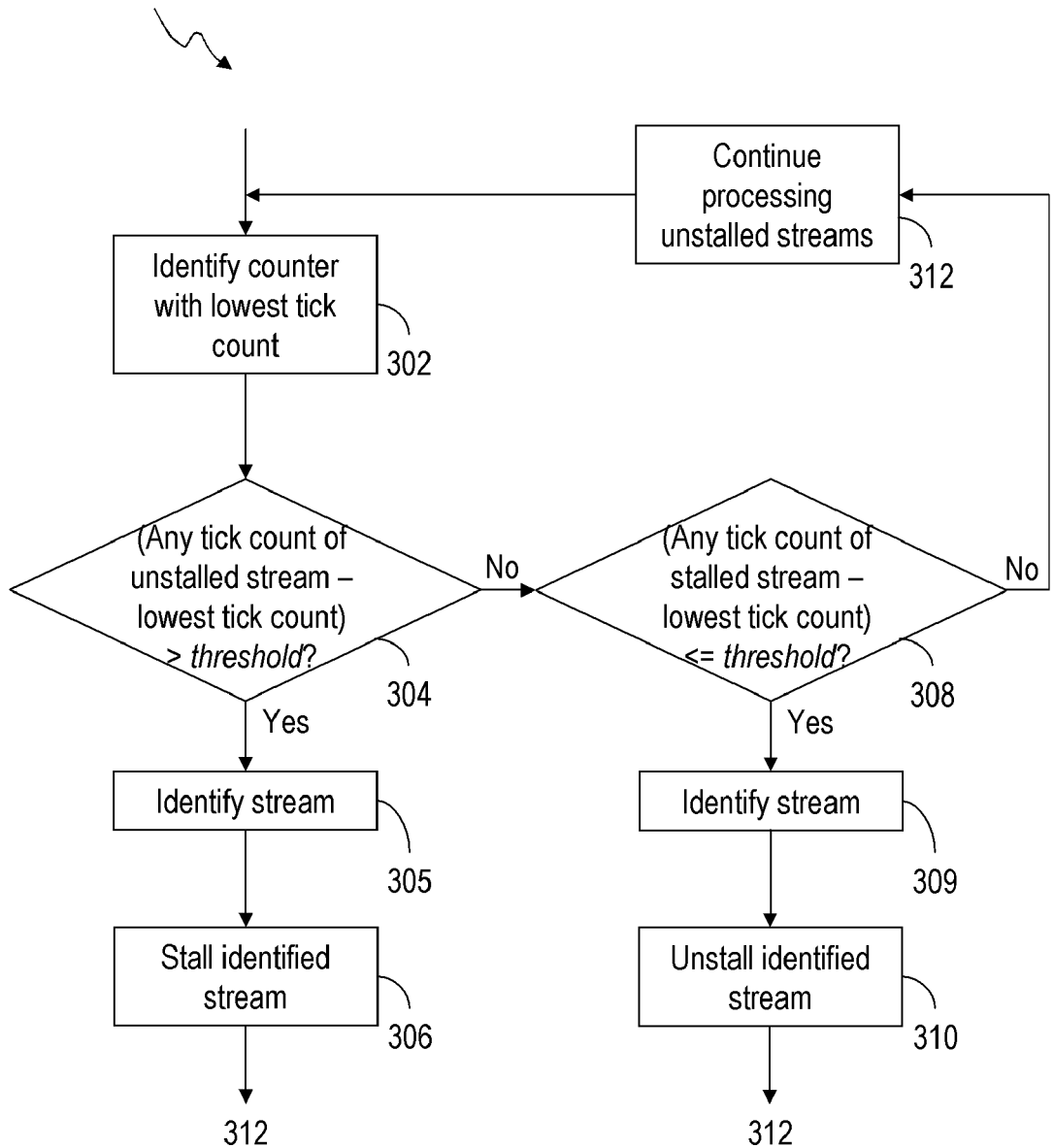
FIG. 3 is a flow diagram of a process that a Z-crossbar follows to utilize the tick information to control the processed fragment streams for the ROP units, according to one embodiment of the present invention.

FIG. 3 is a flow diagram of a process 300 that Z-crossbar 220 follows to utilize the tick information to control the processed fragment streams for the ROP units, according to one embodiment of the present invention. As an illustration, suppose tick counters 222, 224, and 226 are responsible for tracking the ticks associated with the processed fragment streams from shader engine$_0$ to ROP$_0$, shader engine$_1$ to ROP$_1$, and shader engine$_n$ to ROP$_n$, referred to as processed fragment stream$_0$, processed fragment stream$_1$, and processed fragment stream$_n$, respectively. If any of the tick counter (e.g., tick counter 224) in Z-crossbar 220 encounters a tick accompanying a packet of work that has been processed by its corresponding shader engine (e.g., shader engine$_1$), then the tick counter increments the tick count by the tick count associated with the incoming packet. Similarly, if the tick counter encounters a coherence tick packet, then the tick counter increments by the number of ticks (e.g., 5 ticks) conveyed by the packet. At certain intervals, Z-crossbar 220 inspects the tick counters of the unstalled streams and identifies the tick counter with the lowest tick count in step 302. Suppose tick counter 222 has the lowest tick count. This means that the processing of the fine raster transactions received by shader engine$_d$ is falling behind the other shader engines in parallel rendering system 200, increasing the likelihood of divergence among the shader engines, as discussed above. In one implementation, in step 304, Z-crossbar 220 determines whether any tick counters of the unstalled streams have tick counts that exceed the lowest tick count determined in step 302 by more than a threshold value, where the threshold value is measured as a number of ticks. If such a tick count satisfying the condition in step 304 exists, then in step 305, Z-crossbar 220 identifies the processed fragment stream that corresponds to such a tick count. In step 306, Z-crossbar 220 stalls the processed fragment stream identified in step 305 such that the associated ZROP request stream to the frame buffers is also stalled. Then, Z-crossbar 220 continues to process unstalled streams in step 312. By using a threshold number, Z-crossbar 220 effectively allows for some divergence among the shader engines and provides shader engine$_d$ with some leeway to catch up without having to institute stalls. The threshold can either be a predetermined number or a programmable number. It should be apparent to a person of ordinary skill in the art to establish other criteria for stalling processed fragment streams without exceeding the scope of the claimed invention.

On the other hand, if the conditions in step 304 are not met, then in step 308, Z-crossbar 220 inspects the tick counters of all the stalled streams to determine whether any such stalled streams have associated tick counts that are less than or equal to the sum of the lowest tick count determined in step 304 and the aforementioned threshold value. If so, Z-crossbar 220 identifies the processed fragment stream eligible to be unstalled in step 309, unstalls the identified stream in step 310, and continues to process unstalled streams in step 312. If Z-crossbar 220 fails to identify any processed fragment stream with a tick count that satisfies the conditions set forth either in step 304 or step 308, then Z-crossbar 220 continues to process unstalled streams in step 312. Although FIG. 3 and the discussions above mainly focus on the stalling or unstalling of one processed fragment stream, it should be apparent to a person with ordinary skills in the art to apply the teachings to multiple processed fragment streams simultaneously. It should also be apparent to a person with ordinary skills in the art to implement other releasing mechanisms for stalled streams. For example, one scheme may be to release multiple stalled streams once the tick counter with the lowest tick count is incremented.

Alternatively, instead of instituting stalls, one embodiment of Z-crossbar 220 may favor the processed fragment streams associated with the low tick counts by assigning a high priority levels to these streams. Using the example discussed above, suppose ZROP request stream$_0$ and ZROP request stream$_1$ associated with processed fragment stream$_0$ and processed fragment stream$_1$, respectively, are destined to access the same frame buffer, $FB_1$. Since ZROP request stream$_0$ is associated with the lowest tick count, Z-crossbar 220 would in effect direct ZROP request stream$_0$ to $FB_1$ ahead of ZROP request stream$_1$. The discussions relating to Z-crossbar 220 above also apply to the operations of C-crossbar 230.

Although tick generator and tick counters have been discussed in great details above, rendering parallel system 200 can be implemented with a timestamp counter, according to another embodiment of the present invention. Specifically, instead of generating ticks for transactions and counting the number of ticks, the timestamp counter increments each time a tick would have been issued and marks each data packet with the current timestamp. Then, neither Z-crossbar 220 nor C-crossbar 230 needs tick counters. Instead, Z-crossbar 220 and C-crossbar 230 simply compare timestamps of incoming packets to determine which streams are behind or ahead and perform corrective steps as discussed above.

Unlike the aforementioned processed fragment streams and ROP request streams, the mechanism for processing the tick information associated with the texture streams takes into account the out-of-order processing nature within each shader engine. Specifically, parallel graphics system 200 has multiple texture units that make texture requests to multiple memory controllers. Because there is no fixed mapping between these texture units and the memory controllers holding the requested texture elements, at any instant in time, a texture unit can be waiting for results from several memory controllers while a given memory controller can be processing requests from several texture units. The following discussions describe one embodiment of managing these parallel texture streams that improves the locality of the texture streams presented to the memory controllers.

More specifically, in addition to tracking the number of ticks that it encounters, tick counters 208, 212, and 216 in the shader engines also time stamp the tiles of work in between ticks. The tiles of work in between pairs of ticks are generally expected to be coherent, since they are generally associated with the same puddle in screen space. The aggregate work associated with the tiles of work in between two ticks is referred to as a "wavefront." The time stamp for the wavefront, also referred to as the wavefront ID, is the tick count at the time the tick counter first encounters the wavefront. Each tile of work within a given wavefront receives the same time stamp or wavefront ID.

Figure 4:
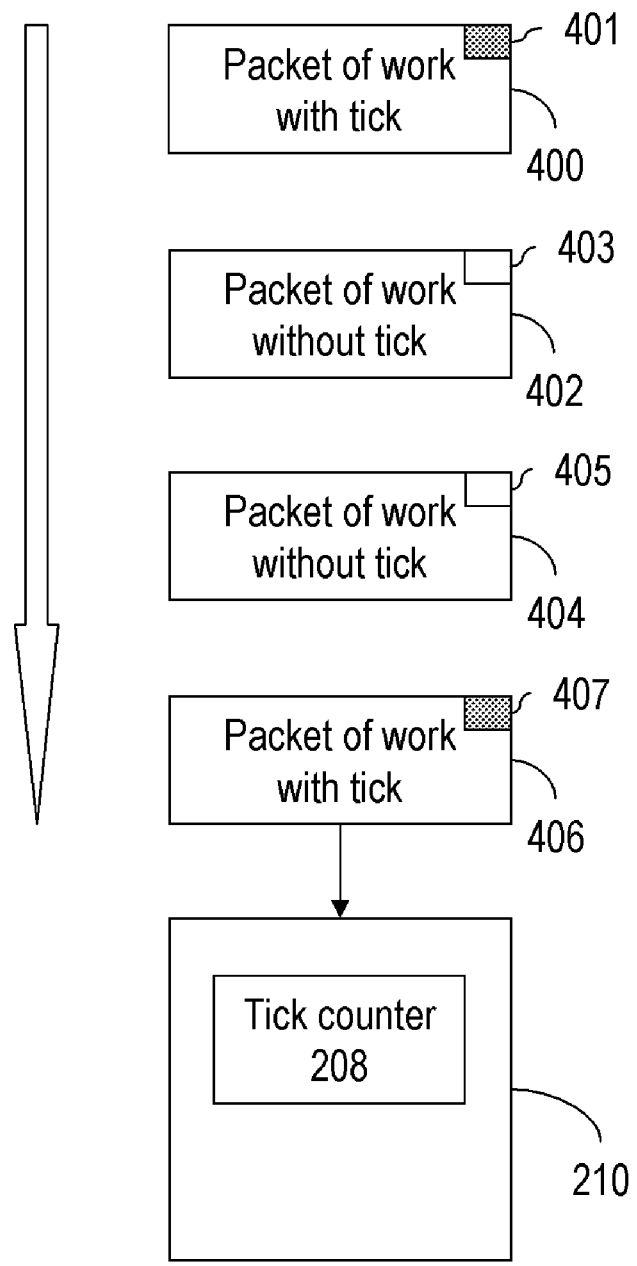
FIG. 4 is a conceptual diagram of four packets of work going into a shader engine, according to one embodiment of the present invention.

To further illustrate the processing of the wavefronts, in conjunction with FIG. 2, FIG. 4 is a conceptual diagram of four packets of work going into a shader engine. Suppose the current tick count maintained by tick counter 208 in shader engine 210 is 25. When tick counter 208 receives packet 406, which includes both work and a tick, represented by a shaded area 407, it increments the tick count to 26. In addition, tick counter 208 also time stamps packet 406 with the tick count of 26. Because packets 402 and 404 do not contain ticks, represented by unshaded areas 403 and 405, respectively, but contain work, tick counter 208 time stamps both packets with the same tick count of 26. When tick counter 208 receives packet 400, which includes work and a tick, also represented by a shaded area 401, it increments the tick count to 27. Collectively, packets 402, 404, and 406 constitute a wavefront with the wavefront ID of 26.

Figure 5A:
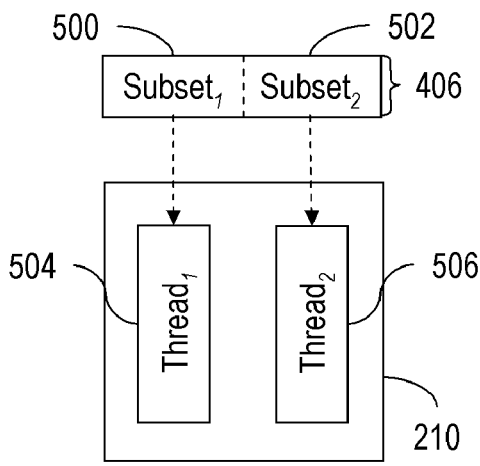
FIG. 5A is a simplified conceptual diagram of two threads in a shader engine independently operating on the two subsets of pixels associated with a packet of work, according to one embodiment of the present invention.

To expand the discussions above to cover the operations of multiple threads in shader engine 210, again in conjunction with FIG. 2, FIG. 5A is a simplified conceptual diagram of two threads being executed in shader engine 210 independently operating on the two subsets of pixels associated with a packet of work. Suppose the pixels associated with packet 406 can be diced into two subsets of pixels, subset$_1$ 500 and subset$_2$ 502. Suppose also that packet 406 has been time stamped with the tick count of 26. Subset$_1$ 500 and subset$_2$ 502 are thus associated with the same tick count of 26. In one implementation, thread$_1$ 504 and thread$_2$ 506 independently maintain buffers of information relating to the wavefronts of work they receive but have yet to completely process. More specifically, when thread$_1$ 504 and thread$_2$ 506 receive subset$_1$ 500 and subset$_2$ 502, respectively, at time 1, the buffers associated with thread$_1$ 504 and thread$_2$ 506 would both contain the wavefront ID of 26 at time 1. However, if at time 2 thread$_1$ 504 has completed processing of its portion of the wavefront (e.g., the subset of pixels associated with packets 402, 404, and 406 shown in FIG. 4), but thread$_2$ 506 has not, then, at time 2, the buffer associated with thread$_2$ 506 would still show the wavefront ID 26 at time 2. However, the buffer associated with thread$_1$ 504 would show the wavefront ID 27, since thread$_1$ 504 would have started processing pixels associated with the next wavefront of work. By using the information contained in the buffers associated with thread$_1$ 504 and thread$_2$ 506, shader engine 210 can detect whether the two threads are operating out of phase and, if need be, perform the appropriate corrective actions (e.g., stalling the thread that is ahead; favoring the thread that is behind).

Figure 5B:
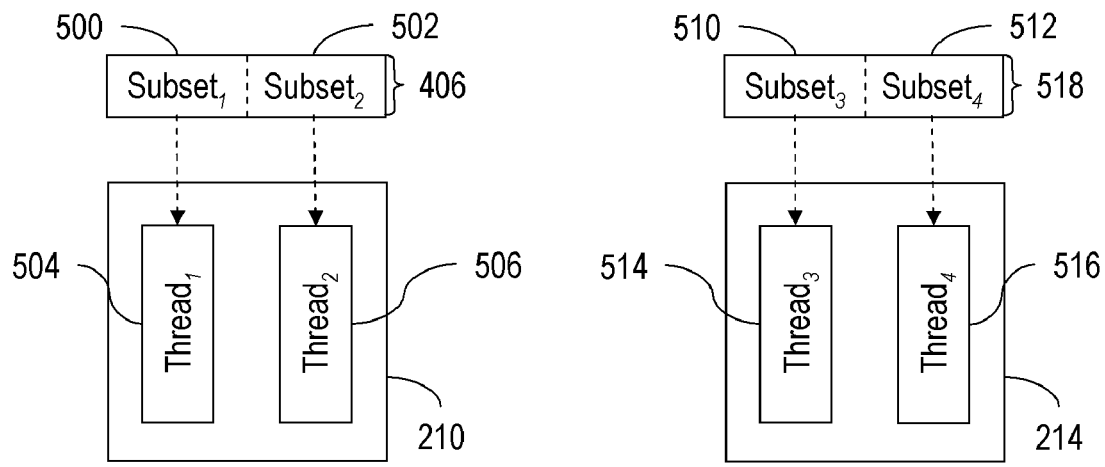
FIG. 5B is a simplified conceptual diagram of two threads in one shader engine and two threads in another shader engine independently operating on subsets of pixels associated with packets of work, according to one embodiment of the present invention.

Moving from the operations of the multiple threads in a single shader engine to the operations of the multiple shader engines, also in conjunction with FIG. 2, FIG. 5B is a simplified conceptual diagram of two threads in shader engine 210 and two threads in shader engine 214 independently operating on subsets of pixels associated with packets of work. Following the discussions of FIG. 5A above, suppose thread$_1$ 504 and thread$_2$ 506 in shader engine 210 still operate on subset$_1$ 500 and subset$_2$ 502, and, in parallel, thread$_3$ 514 and thread$_4$ 516 in shader engine 214 operate on two subsets of pixels, subset$_3$ 510 and subset$_4$ 512, associated with another packet of work, 518. It should be noted that shader engines 210 and 214 reside in different shader engines and receive independent streams of fine raster transactions. Specifically, the packets of work associated with the fine raster transactions received by shader engine 210 and shader engine 214 are from fine raster$_0$ and fine raster$_1$, respectively. Since shader engine$_0$ and shader engine$_1$ operate independently and the threads within the two shader engines also operate independently, the time at which each of these four threads is able to complete the processing of the wavefronts that it receives may vary significantly.

Figure 6:
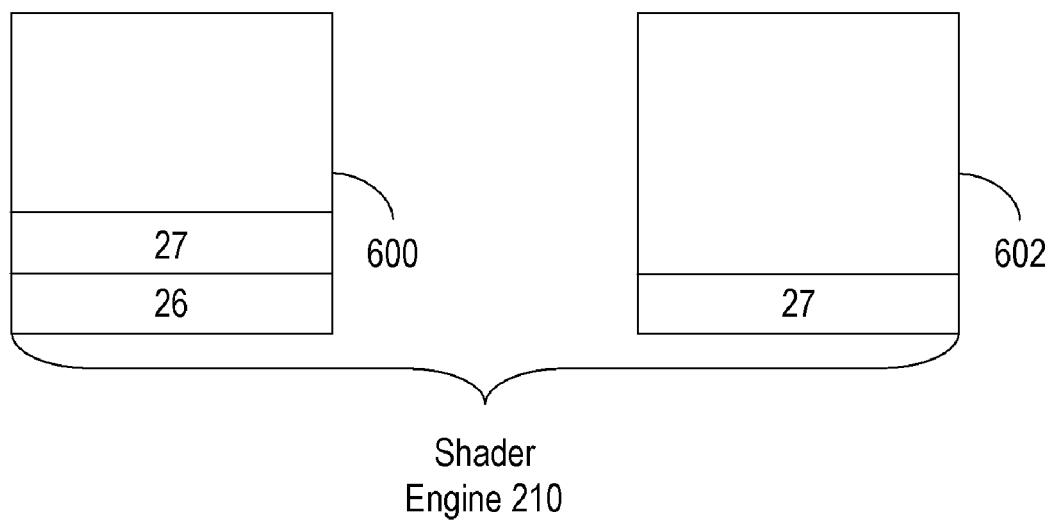
FIG. 6 is a simplified conceptual diagram of the content of the buffers associated with the threads in two shader engines, according to one embodiment of the present invention.
Figure 6:
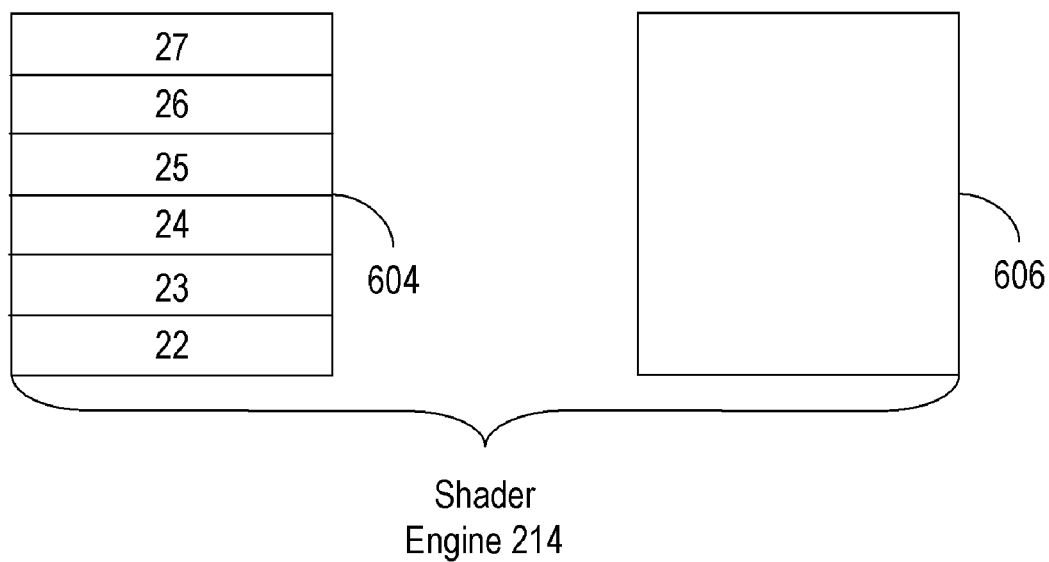

To illustrate, FIG. 6 is a simplified conceptual diagram of the content of the buffers associated with the threads in shader engines 210 and 214. After some processing by these threads, the buffer associated with thread$_1$ 504, buffer 600, may contain the wavefront IDs of 26 and 27; the buffer associated with thread$_2$ 506, buffer 602, may contain the wavefront ID 27; the buffer associated with thread$_3$ 514, buffer 604, may contain wavefront IDs 22 to 27; and the buffer associated with thread$_4$ 516, buffer 606, may contain nothing. This diagram shows that thread$_3$ 514 in shader engine 214 has the largest backlog of wavefronts to process, but thread$_4$ 516, which is within the same shader engine 214, has already finished processing of all of its wavefronts. To ensure the different threads executing in the different shader engines do not move too far out of phase, T-crossbar 240 shown in FIG. 2 is configured to monitor the buffers associated with the different threads executing in the shader engines and take corrective measures.

Figure 7:
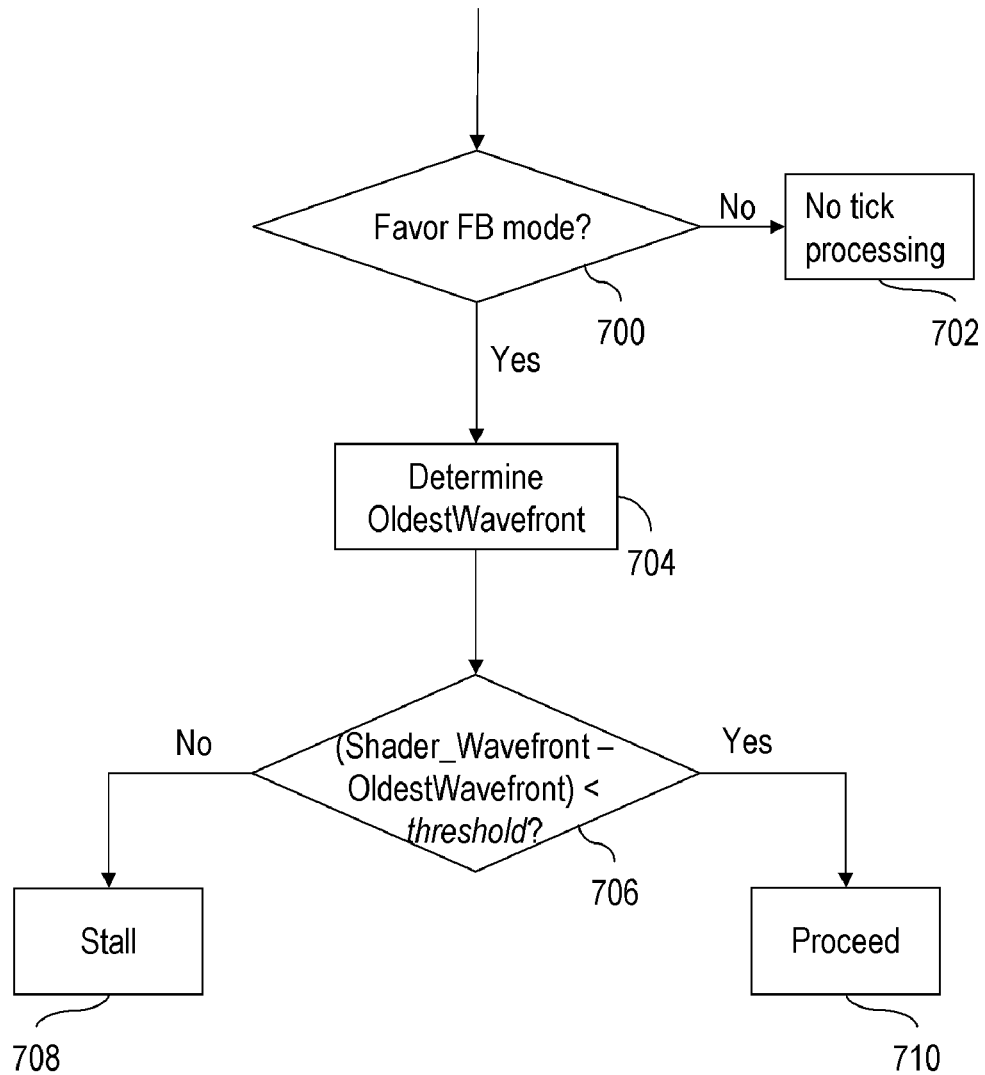
FIG. 7 is a flow diagram of a process that one embodiment of a T-crossbar follows to manage the texture streams from the multiple shaders in the shader engines, according to one embodiment of the present invention.

FIG. 7 is a flow diagram of a process that T-crossbar 240 follows to manage the texture streams from the multiple shaders in the shader engines, according to one embodiment of the present invention. In one implementation, T-crossbar 240 supports two operational modes, "Favor FB" mode and "Favor Shader" mode. Favor FB mode is activated when the performance of parallel rendering system 200 may be limited by the operations of the frame buffers. For example, one approach is to implement a programmable watermark in each frame buffer request queue. If the data stored in frame buffer request queue fill beyond this watermark, then Favor FB mode is activated. When T-crossbar 240 is in Favor FB mode, then it uses the tick information to change the priority of texture requests to improve the coherence of frame buffer requests as discussed above. On the other hand, Favor Shader mode is activated when the performance of parallel rendering system 200 may be bound by the operations of the shader engines. When T-crossbar 240 is in Favor Shader mode, it does not use tick information to influence the priority of texture requests.

If T-crossbar 240 is in Favor FB mode as determined in step 700, then it proceeds to control the texture requests destined for the different frame buffers, such as FB$_0$ shown in FIG. 2. Specifically, in step 704, T-crossbar 240 determines the "Oldest Wavefront" among all the shader engines, which refers to the wavefront with the lowest wavefront ID among all the shader engines. Then in step 706, for a given texture request, T-crossbar 240 determines whether the difference between the oldest wavefront in a particular shader engine (also referred to as the "Shader_Wavefront") and the OldestWavefront exceeds a programmable threshold (again, measured in the number of ticks). For example, suppose that shader engine$_d$ is responsible for processing that given texture request. If the difference between Shader_Wavefront for shader engine$_0$ and the OldestWavefront is less than the threshold number, then T-crossbar 240 proceeds in step 710 to handle the texture requests from shader engine$_0$. If multiple Shader_Wavefronts from different shader engines also meet the conditions set forth in step 706, then T-crossbar 240 favors the shader engine having the Shader_Wavefront that is the oldest among these multiple Shader_Wavefronts. On the other hand, if the Shader_Wavefront for shader engine$_0$ is greater than or equal to the threshold ahead of the Oldest-Wavefront, then T-crossbar 240 stalls the processing of the texture requests from shader engine$_0$ in step 708. By initiating such a stall, the T-crossbar 240 allows the shader engines to "catch up" to shader engine$_0$, thereby reducing the likelihood of shader engine divergence and inefficient frame buffer accesses.

To further describe the aforementioned process, suppose the threshold is 3, and T-crossbar 240 is in Favor FB mode. Referring back to FIG. 6, the OldestWavefront between shader engine$_0$ and shader engine$_1$ is the wavefront with the wavefront ID of 22. The Shader_Wavefront for shader engine$_0$ refers to the wavefront with the lowest wavefront ID among the threads in shader engine$_0$, 26, and the Shader-_Wavefront for shader engine$_1$ refers to the wavefront with the lowest wavefront ID among the threads in shader engine$_1$, 22. Thus, for the requests received from shader engine$_0$, the difference between the Shader_Wavefront for shader engine$_0$ (i.e., 26) and the OldestWavefront (i.e., 22) is 4. Because 4 is greater than the threshold of 3, T-crossbar 240 stalls the processing of the requests from shader engine$_0$ in step 708. In other words, because at least one thread within shader engine$_0$ has moved unacceptably ahead of the slowest operating thread in parallel rendering system 200, the processing of the requests from shader engine$_0$ are stalled to allow for the slowest thread to catch up. However, for the requests received from shader engine$_1$, the difference between the Shader-_Wavefront for shader engine$_1$ (i.e., 22) and the OldestWavefront (i.e., 22) is 0, which is less than 3. Therefore, T-crossbar 240 then proceeds with the processing of the requests from shader engine$_1$ in step 710.

Figure 8:
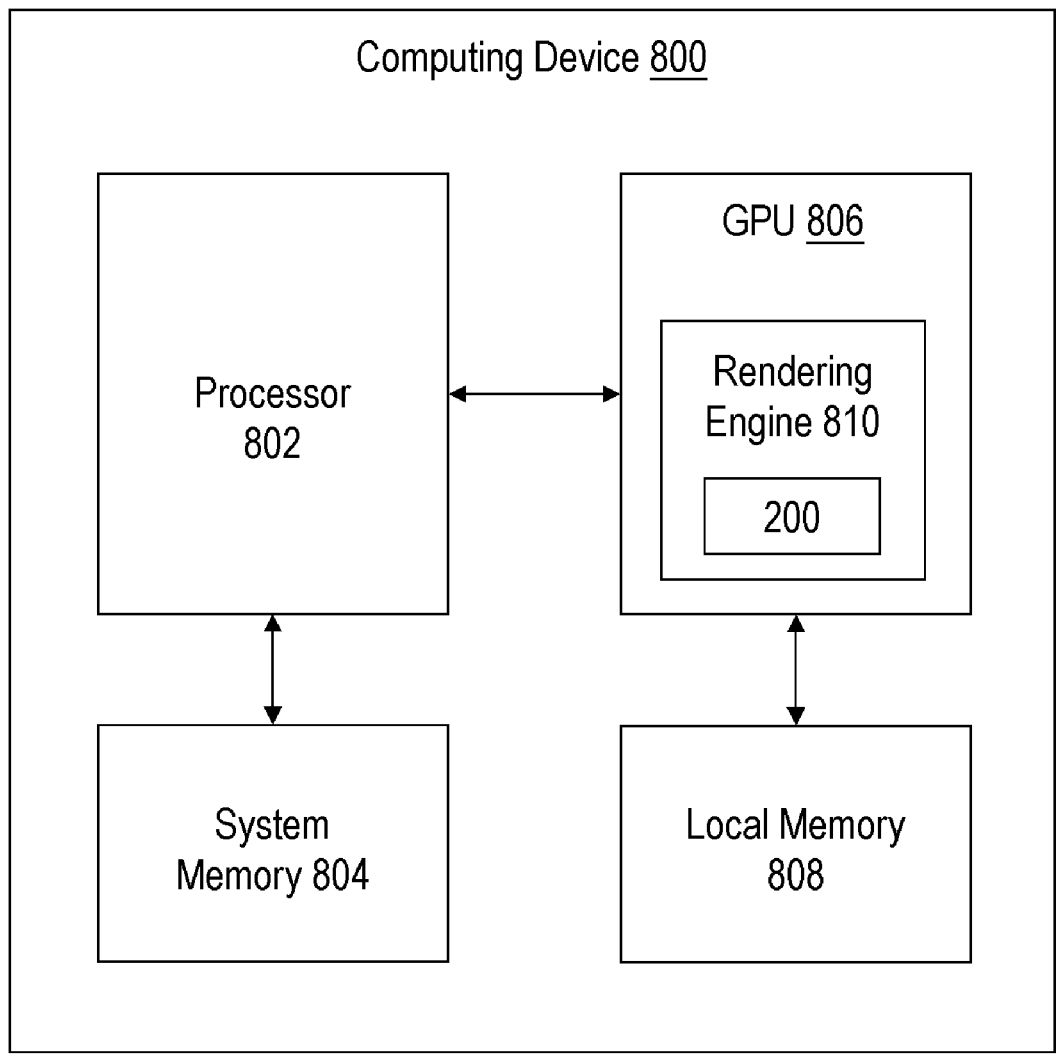
FIG. 8 is a conceptual diagram of a computing device configured to implement one or more embodiments of the present invention.

FIG. 8 is a conceptual diagram of a computing device configured to implement one or more embodiments of the present invention. Computing device 800 includes, without limitation, processor 802, system memory 804, graphics processing unit ("GPU") 806 and local memory 808 coupled to one or more GPUs, such as GPU 806. GPU 806 includes parallel rendering system 200, as described above. The functionality of GPU 806 can be part of any processing unit, such as, without limitation, processor 802, a chip set (not shown in FIG. 8), or other special-purpose processing unit (not shown in FIG. 8). Persons skilled in the art will recognize that any system having one or more processing units configured to implement the teachings disclosed herein falls within the scope of the present invention. Thus, the architecture of computing device 800 in no way limits the scope of the present invention.

In summary, parallel rendering system 200 shown in FIG. 2 utilizes the tick information to improve the coherency of independently processed ROP request streams and texture streams. The above description illustrates various embodiments of a parallel rendering system with screen-mapped processing clusters, tick generation, tick counters, bimodal configurations, wavefront definitions, wavefront tracking, and multi-thread and multi-shader engine processing management along with examples demonstrating certain aspects of how such embodiments operate. It should however be emphasized that the above examples, embodiments, and drawings should not be deemed to be the only embodiments, and are presented to illustrate the flexibility and advantages of the present invention as defined by the following claims.

We claim:

1. A method for improving frame buffer efficiency in a parallel rendering system, comprising:
   receiving a common input stream through a distributor;
   tracking an occurrence of a periodic event within the common input stream;
   generating a plurality of fragment streams from the common input stream, wherein each fragment stream is independently processed by a different shader engine and corresponds to one of a plurality of raster operation (ROP) request streams;
   based on the occurrence of the periodic event within the common input stream, inserting a tick in a first fragment stream in the plurality of fragment streams, wherein generation of the tick is based on a location in screen space where work associated with the first fragment stream is being performed;

utilizing the tick to influence the processing of the first fragment stream so that the plurality of ROP request streams maintains substantially the same coherence as the common input stream;
specifying an area in the screen space that relates to certain portions of a frame buffer;
advancing a tick count associated with the first fragment stream in response to a tile of work associated with the first fragment stream falling outside of the specified area; and
transmitting the tick through a coherence tick packet in response to no work being transmitted to branches of the parallel rendering system during the clock cycle in which the tick is generated.

2. The method of claim 1, wherein the same number of ticks is associated with each of the plurality of fragment streams.

3. The method of claim 2, further comprising coupling the tick with a packet of work, wherein the packet of work is transmitted to a branch of the parallel rendering system during the clock cycle in which the tick is generated.

4. The method of claim 1, wherein the coherence tick packet represents a plurality of the ticks in response to no work being transmitted to the branches of the parallel rendering system during consecutive clock cycles in which each of the plurality of ticks is generated.

5. The method of claim 3, wherein the packet of work further includes a field that conveys a plurality of the ticks.

6. The method of claim 2, further comprising favoring the processing of the first fragment stream in response to the tick count associated with the first fragment stream indicating that the first fragment stream is falling behind of the rest of the plurality of fragment streams relative to the common input stream.

7. The method of claim 2, further comprising stalling the processing of the first fragment stream in response to the tick count associated with the first fragment stream indicating that the first fragment stream is ahead of the rest of the plurality of fragment streams relative to the common input stream.

8. The method of claim 7, further comprising determining whether the difference between the tick count associated with the first fragment stream and a lowest tick count across all of the plurality of fragment streams reaches a threshold value.

9. A parallel rendering system for improving frame buffer efficiency, comprising:
a coarse rasterizer configured to generate a plurality of fragment streams from a common input stream, wherein each fragment stream is independently processed by a different shader engine and corresponds to one of a plurality of raster operation (ROP) request streams;
a tick generator configured to:
track an occurrence of a periodic event within the common input stream, and
based on the occurrence of the periodic event within the common input stream, insert a marker in a first fragment stream in the plurality of fragment streams;
a tick counter in a crossbar configured to maintain a tick count associated with the first fragment stream, wherein the tick counter advances the tick count associated with the first fragment stream in response to a tile of work associated with the first fragment stream falling outside of a specified area, and wherein the tick is transmitted along with a coherence tick packet in response to no work being transmitted to branches of the parallel rendering system during the clock cycle in which the tick is generated; and
the crossbar configured to utilize the tick count to influence the processing of the first fragment stream so that the plurality of ROP request streams maintains substantially the same coherence as the common input stream.

10. The parallel rendering system of claim 9, wherein the same number of ticks is associated with each of the plurality of fragment streams.

11. The parallel rendering system of claim 9, wherein a tick is coupled with a packet of work, wherein the packet of work transmitted to a branch of the parallel rendering system during the clock cycle in which the tick is generated.

12. The parallel rendering system of claim 9, wherein the crossbar further favors the processing of the first fragment stream in response to the tick count associated with the first fragment stream indicating that the first fragment stream is falling behind of the rest of the plurality of fragment streams relative to the common input stream.

13. The parallel rendering system of claim 9, wherein the crossbar further stalls the processing of the first fragment stream in response to the tick count associated with the first fragment stream indicating that the first fragment stream is ahead of the rest of the plurality of fragment streams relative to the common input stream.

14. A computing device, comprising:
a memory; and
a processing unit that includes a parallel rendering system with a distributor and
a crossbar, further including:
a coarse rasterizer configured to generate a plurality of fragment streams from a common input stream, wherein each fragment stream is independently processed by a different shader engine and corresponds to one of a plurality of raster operation (ROP) request streams,
a tick generator configured to:
track an occurrence of a periodic event within the common input stream, and
based on the occurrence of the periodic event within the common input stream, inserting a marker in a first fragment stream in the plurality of fragment streams,
the counter configured to maintain a tick count associated with a first fragment stream in the plurality of fragment streams, wherein the counter advances the tick count associated with the first fragment stream in response to a tile of work associated with the first fragment stream falling outside of a specified area, and wherein the tick is transmitted along with a coherence tick packet in response to no work being transmitted to branches of the parallel rendering system during the clock cycle in which the tick is generated, and
the crossbar configured to utilize the tick count to influence the processing of the first fragment stream so that the plurality of ROP request streams maintains substantially the same coherence as the common input stream.

* * * * *